(12) United States Patent
Parshall et al.

(10) Patent No.: US 7,175,866 B2
(45) Date of Patent: *Feb. 13, 2007

(54) TOCOPHEROLS AS FLAVOR ANTIOXIDANT IN CITRUS JUICE

(75) Inventors: Kristin Parshall, Bradenton, FL (US); Richard N. McArdle, Bradenton, FL (US); Cindy L. Hart, Myarra City, FL (US); Renee Mellican, Bradenton, FL (US)

(73) Assignee: Tropicana Products, Inc., Bradenton, FL (US)

( * ) Notice: Subject to any disclaimer, the term of this patent is extended or adjusted under 35 U.S.C. 154(b) by 495 days.

This patent is subject to a terminal disclaimer.

(21) Appl. No.: 10/661,711

(22) Filed: Sep. 12, 2003

(65) Prior Publication Data

US 2005/0058764 A1   Mar. 17, 2005

(51) Int. Cl.
*A23L 1/302* (2006.01)

(52) U.S. Cl. .................. 426/72; 426/541; 426/590; 426/599

(58) Field of Classification Search .................. 426/72, 426/590, 599, 541
See application file for complete search history.

(56) References Cited

U.S. PATENT DOCUMENTS

| | | | |
|---|---|---|---|
| 1,924,708 A | 8/1933 | Christiansen et al. | |
| 2,349,278 A | 5/1944 | Hickman | |
| 2,383,816 A | 8/1945 | Riemenschneider et al. | |
| 2,817,589 A | 12/1957 | Walrod | |
| 3,852,502 A | 12/1974 | Bishov et al. | |
| 4,489,099 A | 12/1984 | Shaheen et al. | |
| 4,529,606 A | 7/1985 | Fustier et al. | |
| 4,737,367 A | 4/1988 | Langer et al. | |
| 4,913,921 A | 4/1990 | Schroeder et al. | |
| 4,957,749 A | 9/1990 | Prieels et al. | |
| 4,963,380 A | 10/1990 | Schroeder et al. | |
| 4,966,892 A | 10/1990 | McAnalley | |
| 5,132,121 A | 7/1992 | Orfan et al. | |
| 5,141,758 A | 8/1992 | Monte | |
| 5,198,254 A | 3/1993 | Nisperos-Carriedo et al. | |
| 5,234,702 A | 8/1993 | Katz et al. | |
| 5,376,391 A | 12/1994 | Nisperos-Carriedo et al. | |
| 5,443,830 A | 8/1995 | Moore et al. | |
| 5,468,508 A | 11/1995 | Wu et al. | |
| 5,607,707 A * | 3/1997 | Ford et al. | 426/2 |
| 5,609,896 A | 3/1997 | Cox et al. | |
| 5,616,358 A | 4/1997 | Taylor et al. | |
| 5,667,863 A | 9/1997 | Cullen et al. | |
| 5,780,086 A | 7/1998 | Kirksey et al. | |
| 6,162,474 A * | 12/2000 | Chen et al. | 426/72 |
| 6,641,847 B1 * | 11/2003 | Nawar | 424/732 |

* cited by examiner

*Primary Examiner*—Helen Pratt
(74) *Attorney, Agent, or Firm*—Banner & Witcoff, Ltd.

(57) ABSTRACT

Citrus juice beverages having an oil soluble flavor antioxidant added thereto are provided. A tocopherol antioxidant, other than alpha-tocopherol, is added to a citrus juice beverage, such as orange juice, to preserve the flavor sensory attributes of stored juice without deteriorating the initial flavor sensory attributes of the juice.

36 Claims, No Drawings

TOCOPHEROLS AS FLAVOR ANTIOXIDANT IN CITRUS JUICE

FIELD OF THE INVENTION

The present invention is directed to citrus juice having antioxidants added thereto. More specifically, the present invention relates to the addition of a tocopherol other than an alpha-tocopherol as a flavor antioxidant to citrus juice, preferably orange juice. The present invention also relates to a method of maintaining superior flavor and sensory attributes of citrus juices, especially not-from-concentrate juices and juice-containing beverages.

BACKGROUND OF THE INVENTION

Orange juice is an excellent source of many essential nutrients the body needs for optimum health. For example, Tropicana Products Company sells not-from-concentrate (NFC) orange juice products which provide a full day supply of Vitamin C, and are good sources of folate and potassium. Tropicana also sells orange juice which has, for example, calcium or extra Vitamin C added thereto. Such products, however, do not have antioxidants added thereto.

Tropicana also offers an orange juice product that contains 100% of recommended daily value (RDV) of Vitamin E. In order to achieve this level of Vitamin E, supplemental Vitamin E is added directly to the juice during production in the form of a water-soluble powder. This powder is added to provide a juice which has in excess of 300 ppm of tocopherol acetate or alpha-tocopherol. Previously, Tropicana offered Vitamin E enriched orange juice which had a lesser amount of alpha-tocopherol and accordingly did not have 100% of the recommended daily value of Vitamin E. Alpha-tocopherol, however, while being an excellent source of Vitamin E, is not very high in antioxidant activity. This is believed to be the result of the acetate bond therein preventing the alpha-tocopherol from acting as an antioxidant. None of these juices had any other tocopherols or antioxidants present therein.

Another example of a juice drink with Vitamin E added thereto is disclosed in U.S. Pat. No. 4,737,367 (Langer et al.). This patent discloses adding Vitamin E in the form of d-alpha tocopherol succinate to fruit juice, such as citrus juice. This type of tocopherol adds minimal antioxidant activity to the juice.

Despite these many advances in citrus juice and especially in orange juice, there still is a substantial need in the field for means that will help maintain fresh orange juice. With the present orange juice products, advantageous orange flavor notes tend to fade during storage of the juice. This results in a shorter than desired superior flavor shelf life for the juice.

Accordingly, it is a general object of the present invention to provide a means for maintaining the valuable flavor and/or sensory qualities in stored citrus and orange juice beverages.

While it has been generally known that antioxidants are useful for flavor maintenance in foods, prior efforts have not discovered an antioxidant which will mix well with citrus juice or orange juice and maintain the flavor of stored juice, and not deteriorate or negatively impact the initial flavor of the juice. This is especially the case for NFC and juice-containing beverages juices which, aside from pasteurization, are untreated.

Further, while it has been disclosed that antioxidants, such as tocopherol composition Covi-ox® T-70, can be used in fish oil-containing orange flavored beverages, see U.S. Pat. No. 4,963,380 (Schroeder et al.), such beverages are directed to stabilizing the fish oil therein. As a result, such beverages require fructose and emulsifiers in the beverage. Further, such beverages contain only small amounts of orange juice and would not qualify for labeling purposes as 100% juice or an orange juice beverage containing substantial quantities of juice.

Previously, it was believed that the addition of an oil soluble liquid to a water based juice, such as citrus juice and citrus juice beverages, would result in ringing, see for example U.S. Pat. No. 6,162,474 (Chen et al.). Ringing is the formation of a separate oil soluble layer on top of the juice. To solve this problem, Chen et al. discloses using a powder composition comprising droplets of fat-soluble vitamin which can be added to a beverage, such as citrus juice.

Accordingly, it is a further object of the present invention to provide an antioxidant which will satisfactorily mix with citrus juice, and particularly orange juice, while meeting the above objectives, which are especially important for NFC juices, but also are important in other citrus juices and citrus juice beverages.

SUMMARY OF THE INVENTION

The present invention is directed to citrus juice having added thereto a tocopherol additive or composition as a flavor preservative antioxidant. Preferably, the tocopherol composition includes at least one tocopherol other than alpha-tocopherol. Such tocopherols are oil soluble antioxidants which were previously not expected to have an effect in a water-based beverage such as orange juice. The present invention also encompasses a method for enhancing or maintaining sensory attributes of citrus juices by incorporating certain tocopherol sources into the juices.

Preferably, the citrus juices are juices from one or more citrus fruits, such as for example, orange, grapefruit, tangerine, lemon and combinations thereof.

Preferably, the tocopherol composition is in liquid form and is comprised of one or more tocopherol other than alpha-tocopherol. In a further embodiment, the tocopherol composition is a mixed tocopherol of two or more tocopherols. In a still further embodiment, the mixed tocopherols include no more than approximately 20 weight percent of alpha-tocopherols.

The tocopherol composition is incorporated into the citrus juice at a level of at least about 40 ppm tocopherol, and typically not more than about 1300 ppm. Preferably, the tocopherol composition is added to the juice at levels between about 50 ppm and about 500 ppm, and most preferably between about 100 ppm and about 200 ppm.

The citrus juice composition and method of the present invention provide better flavor maintenance for storage of juice over prior products and help to maintain sensory attributes such as the fresh orange and raw orange flavor in the stored juice.

The citrus juice composition and method of the present invention also provide a citrus juice having a better initial flavor than juice with other natural antioxidants added thereto.

DETAILED DESCRIPTION OF THE PRESENTLY PREFERRED EMBODIMENTS

The present invention is directed to citrus, and preferably orange, juice with an oil soluble antioxidant component added thereto. The antioxidant component is preferably formed of at least one tocopherol other than alpha-tocopherol, and is more preferably, some mixture of tocopherols.

The tocopherol additive or composition is preferably made up of some combination of beta, gamma and/or delta tocopherol isomers, with a lesser amount of alpha-tocopherols (when present). The high content of non-alpha-tocopherols in the tocopherol composition provides a strong anti-oxidant effect. Preferably, the alpha-tocopherols, when present, comprise between 0 to 20 weight percent of tocopherol additive. Depending upon the goals of the citrus juice manufacturer, the amount of any alpha-tocopherol can be varied. More specifically, if a higher amount of antioxidant activity is desired and Vitamin E enrichment is not a concern, then less alpha-tocopherol is used in the tocopherol composition added to the juice. In contrast, if Vitamin E enrichment is a concern or goal, then a higher amount, approaching the 20 weight percent limit, of alpha-tocopherols could be used in the tocopherol composition, as the alpha-tocopherols provide supplemental Vitamin E fortification. This level of alpha-tocopherol inclusion in the beverage can be supplemental to any other Vitamin E addition to achieve the Vitamin E RDV, for example.

Presently, when producing the tocopherol composition, an edible oil by-product remains in the composition. A maximum amount of 80 weight percent of edible oil in the tocopherol composition is acceptable for addition to the juice. Examples of such edible oils include soybean oil, corn oil, safflower oil and sunflower oil. Generally, most so called domestic oils are acceptable for addition to the juice within the tocopherol additive composition. Preferably, no emulsifying agents are included in the tocopherol additive. Oil content ranges from about 20 to about 80 weight percent, preferably between about 25 and about 70 weight percent. An especially preferred content is about 30 weight percent.

An example of such a mixed tocopherol composition is Covi-ox® T-70 from Cognis Corporation of LaGrange, Ill. This mixed tocopherol composition is made of approximately 14 weight percent d-alpha-tocopherol, 2 weight percent d-beta-tocopherol, 60 weight percent d-gamma-tocopherol and 24 weight percent d-delta-tocopherol. The percentages are as a weight percent of the total weight of tocopherols. The manufacturer guarantees a minimum of 560 mg of non-alpha-tocopherols in 700 mg of total tocopherols in each gram of Covi-ox® T-70 (i.e. at least approximately 80 weight percent of non-alpha-tocopherols). This tocopherol additive composition also includes edible oil. Other sources and other blends of mixed tocopherol compositions can also be used which have similar relatively low, or lower alpha-tocopherol levels, or do not contain alpha-tocopherols beyond possible trace amounts.

The tocopherol antioxidant composition can be added to the juice or juice beverage at any time. While preferably the tocopherol composition is added before pasteurization of the juice, it can also be added after pasteurization. Usually, the tocopherol composition will be liquid when added. The juice composition is pasteurized and otherwise prepared in a conventional manner. The juice composition could also be concentrated and frozen for storage, to be reconstituted at a later time with water to the desired concentration. The juice composition also can be a beverage containing substantial quantities of juice, such as on the order of 40% by weight or above, along with water, such as on the order of 20% by weight or above.

Preferably, the tocopherol antioxidant composition is added either directly to the juice, or added after premixing with a citrus oil composition in an otherwise conventional oil add-back step. Preferably, between about 40 ppm and about 1300 ppm of tocopherol(s) are added to the beverage. It has been found that the tocopherol composition of the present invention stays suspended in the citrus juice or citrus juice beverage without ringing. The tocopherol composition can be added to the juice or oil by, for example, blending with a high shear mixer.

The use of an oil-soluble tocopherol composition was not expected to benefit a water based product such as citrus or orange juice or beverages containing same because tocopherols are oil soluble. It had been expected that tocopherol added to juice would float to the surface of the juice and render the tocopherol ineffective against dissolved oxygen in the product. The present invention, however, has shown that this is not the case.

EXAMPLE 1

A composition of mixed tocopherols in soybean oil was added to 2.6 grams of orange oil (a commercially used oil add-back composition containing natural orange oil). The tocopherol component was added at tocopherol levels of 250 and 500 ppm (i.e. 400 and 700 ppm with edible oil included). The thus prepared tocopherol-containing oil add-back compositions then were added to 52.3 pounds of Pure Premium® orange juice. A control juice with only orange oil added thereto at the same level was also prepared. The juices were packed in glass bottles and stored for 6 weeks at 38° F. (3.3°C). The juices were tasted at three and six weeks, and it was determined that a higher fresh flavor was retained in the tocopherol treated sample then the control juice with only orange oil added. At 6 weeks of age, the bottles were moved to 45° F. (7.2°C) storage to promote oxidation. The samples were reevaluated at approximately 9 weeks of age.

Throughout this testing, ringing was not observed. The composition of the present invention provides better flavor maintenance for juice stored for three to nine weeks over juice with no antioxidant added to the juice and with no negatives such as ringing or negative effects on flavor or specific sensory qualities due to the tocopherol additive.

EXAMPLE 2

The tocopherol compositions of the present invention also were tested for initial flavor in orange juice against the taste of other natural antioxidants in orange juice. In particular, a tocopherol composition according to the present invention (namely Covi-ox® T-70), ascorbic acid, rosemary extract (lipid soluble and water soluble) and peel paste (ground up orange peel), which are all natural antioxidants, were added to juice and tested for initial flavor. The results are shown in the following Table.

TABLE

|  | Control | Tocopherol 500 ppm | Oil Soluble Rosemary Extract | Water Soluble Rosemary Extract | Peel Paste | Ascorbic Acid |
|---|---|---|---|---|---|---|
| Total Orange | 4.3 b | 5.0 a | 4.6 b | 4.5 b | 4.5 b | 4.3 b |
| Raw Orange | 0.5 b | 1.3 a | 0.5 b | 0.6 b | 0.6 b | 0.5 b |
| Cooked Orange | 2.0 a | 1.4 b | 1.9 a | 1.9 a | 1.8 a | 1.9 a |
| Orange Oil | 1.1 bc | 1.3 ab | 0.9 b | 1.1 bc | 1.2 abc | 1.4 a |
| Other Citrus | 0.2 c | 1.0 a | 0.3 bc | 0.6 b | 0.4 bc | 0.9 a |

TABLE-continued

|  | Control | Tocopherol 500 ppm | Oil Soluble Rosemary Extract | Water Soluble Rosemary Extract | Peel Paste | Ascorbic Acid |
|---|---|---|---|---|---|---|
| Sweet | 5.4 b | 5.7 a | 5.7 a | 5.4 b | 5.4 b | 5.3 b |
| Sour | 2.4 bc | 2.2 cd | 2.2 cd | 2.3 bcd | 2.5 b | 3.1 a |

As shown in the Table, the tocopherol composition had a statistically significant positive effect on total orange, raw orange, and cooked orange flavor notes. The tocopherol composition also increased other citrus and sweet scores, while attaining a low sour score.

It will be understood that the embodiments of the present invention which have been described are illustrative of some of the applications of the principles of the present invention. Numerous modifications may be made by those skilled in the art without departing from the true spirit and scope of the invention, including those combinations of features that are individually disclosed or claimed herein.

The invention claimed is:

1. A citrus juice composition comprising citrus juice and a tocopherol composition of at least one tocopherol other than alpha-tocopherol, wherein said tocopherol composition comprises from 0 weight percent to 20 weight percent of alpha-tocopherol.

2. The citrus juice composition of claim 1 wherein said tocopherol composition is in a range of from about 40 ppm to about 1300 ppm of the citrus juice composition.

3. The citrus juice composition of claim 2 wherein said tocopherol composition is in a range of from about 50 ppm to about 500 ppm of the citrus juice composition.

4. The citrus juice composition of claim 3 wherein said tocopherol composition is in a range of from about 100 ppm to about 200 ppm of the citrus juice composition.

5. The citrus juice composition of claim 1 wherein said at least one tocopherol is selected from the group consisting of beta-tocopherol, gamma-tocopherol, delta-tocopherol, and combinations thereof.

6. The citrus juice composition of claim 5 wherein said tocopherol composition had been added to the juice composition while the tocopherol composition was in liquid form.

7. The citrus juice composition of claim 1 wherein said tocopherol composition comprises approximately 14 weight percent d-alpha-tocopherol, approximately 2 weight percent d-beta-tocopherol, approximately 60 weight percent d-gamma-tocopherol and approximately 24 weight percent d-delta-tocopherol, all based on the total weight of tocopherol composition.

8. The citrus juice composition of claim 1 wherein said tocopherol composition also includes an edible oil.

9. The citrus juice composition of claim 8 wherein said edible oil is selected from the group consisting of soybean oil, corn oil, canola oil, safflower oil, sunflower oil, and combinations thereof.

10. The citrus juice composition of claim 8 wherein said tocopherol composition and edible oil comprises between about 20 and about 80 weight percent of edible oil.

11. The citrus juice composition of claim 1 wherein said juice is selected from the group consisting of orange juice, grapefruit juice, lemon juice, tangerine juice, and combinations thereof.

12. The citrus juice composition of claim 1 wherein said juice is not from concentrate orange juice.

13. The citrus juice composition of claim 1 wherein said juice is from concentrate orange juice.

14. The citrus juice composition of claim 1 wherein said juice composition includes at least about 40 weight percent citrus juice, based on the total weight of the juice composition.

15. A citrus juice composition comprising citrus juice and a tocopherol composition of at least one tocopherol other than alpha-tocopherol, wherein said tocopherols comprise no more than 20 weight percent alpha-tocopherols, based on the total weight of the tocopherols.

16. A citrus juice composition comprising:
   citrus juice;
   a tocopherol composition of at least one tocopherol other than alpha-tocopherol, wherein said tocopherol composition is in a range of from about 40 ppm to about 1300 ppm of the citrus juice composition; and
   when alpha-tocopherol is present in the tocopherol composition, said alpha-tocopherol is at no greater than about 20 weight percent of said tocopherol composition.

17. The citrus juice composition of claim 16 wherein said tocopherol composition is in a range from about 50 ppm to about 500 ppm of the citrus juice composition.

18. The citrus juice composition of claim 16 wherein said tocopherol composition is in a range from about 100 ppm to about 200 ppm of the citrus juice composition.

19. The citrus juice composition of claim 16 wherein said at least one tocopherol is selected from the group consisting of beta-tocopherol, gamma-tocopherol, delta-tocopherol, and combinations thereof.

20. The citrus juice composition of claim 16 wherein said juice is at least one juice selected from the group consisting of orange juice, grapefruit juice, lemon juice, tangerine juice, and combinations thereof.

21. A citrus juice composition comprising:
   citrus juice;
   water;
   a tocopherol additive in an amount of between about 40 ppm and about 1300 ppm of the citrus juice composition, wherein said tocopherol additive includes at least one tocopherol other than alpha-tocopherol; and
   when alpha-tocopherol is present, said alpha-tocopherol comprises not more than about 20 weight percent of the tocopherol additive.

22. The citrus juice composition of claim 21 wherein said tocopherol additive comprises mixed tocopherols.

23. The citrus juice composition of claim 21 wherein said tocopherol additive is added at a range of from about 50 ppm to about 500 ppm of the citrus juice composition.

24. The citrus juice composition of claim 21 wherein said tocopherol additive is added at a range of from about 100 ppm to about 200 ppm of the citrus juice composition.

25. The citrus juice composition of claim 22 wherein said mixed tocopherols comprise approximately 0–20 weight percent d-alpha-tocopherol and one or more tocopherols selected from the group consisting of d-beta-tocopherol, d-gamma-tocopherol and d-delta-tocopherol.

26. The citrus juice composition of claim 21 wherein said tocopherol additive comprises mixed tocopherols and an edible oil.

27. The citrus juice composition of claim 21 wherein said citrus juice is at least one juice selected from the group consisting of orange juice, grapefruit juice, lemon juice, tangerine juice, and combinations thereof.

28. The citrus juice of claim 20 wherein said citrus juice comprises at least about 40 weight percent of the composition, and water comprises at least about 20 weight percent of the composition.

29. A method for maintaining flavor sensory attributes in citrus juice beverages, comprising:
   adding a tocopherol composition to a citrus juice beverage to provide an improved citrus juice beverage;
   wherein said tocopherol composition includes at least one tocopherol other than alpha-tocopherol;
   wherein said tocopherol composition includes no more than about 20 weight percent alpha-tocopherols, when present, based on the total weight of tocopherols in said composition; and
   wherein said tocopherol composition is in a range of from about 40 ppm to about 1300 ppm of the citrus juice.

30. The method of claim 29, further including storing said improved citrus juice beverage for at least four weeks of storage time and maintaining said flavor sensory attributes in the citrus juice during the storage time.

31. The method claim of claim 29 further including pasteurizing said citrus juice beverage after adding said tocopherol composition.

32. The method of claim 29 further including pasteurizing said citrus juice beverage prior to adding said tocopherol composition.

33. The method of claim 29 wherein said adding of tocopherol composition includes adding said tocopherol composition in liquid form.

34. The method of claim 29 further comprising premixing said tocopherol composition with a citrus oil to provide a mixture and then adding said mixture to said citrus juice beverage.

35. The method of claim 29 wherein said tocopherol composition includes approximately 0–14 weight percent d-alpha-tocopherol and at least one tocopherol selected from the group consisting of d-beta-tocopherol, d-gamma-tocopherol and d-delta-tocopherol.

36. The method of claim 29 wherein said tocopherol composition also includes an edible oil selected from the group consisting of soybean oil, corn oil, canola oil, safflower oil, sunflower oil and combinations thereof.

* * * * *